United States Patent
Sherlock

(10) Patent No.: US 6,304,936 B1
(45) Date of Patent: *Oct. 16, 2001

(54) ONE-TO-MANY BUS BRIDGE USING INDEPENDENTLY AND SIMULTANEOUSLY SELECTABLE LOGICAL FIFOS

(75) Inventor: Derek A. Sherlock, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/183,704

(22) Filed: Oct. 30, 1998

(51) Int. Cl.$^7$ .............................. G06F 13/00; G06F 13/18; G06F 12/00; H04J 3/02

(52) U.S. Cl. .............................. 710/129; 710/52; 710/54; 710/57; 710/37; 710/112; 710/113; 370/463; 370/412; 370/414

(58) Field of Search ............................ 370/60.1, 412, 370/235, 463; 710/33, 52, 57, 241, 129, 6, 56, 200; 709/212; 712/35; 714/53

(56) References Cited

U.S. PATENT DOCUMENTS

| | | | |
|---|---|---|---|
| 4,757,440 | * | 7/1988 | Scheuneman .......................... 714/53 |
| 4,949,301 | * | 8/1990 | Joshi et al. ............................ 711/100 |

(List continued on next page.)

FOREIGN PATENT DOCUMENTS 0545 575 A1 * 6/1993 (EP) .............................. H04L/12/56

OTHER PUBLICATIONS

TDBD, "High Speed Virtual FIFO Memory", May 1982, v. 24, issue 12, pp. 6488–6489.*

(List continued on next page.)

Primary Examiner—Thomas Lee
Assistant Examiner—Katharina Schuster
(74) Attorney, Agent, or Firm—Kevin M. Hart

(57) ABSTRACT

A one-to-many bus bridge includes a system bus interface, a first I/O bus interface, a second I/O bus interface, a multiple logical FIFO system wherein first and second logical FIFOs share a common storage system, and demultiplexer and control circuitry. The demultiplexer and control circuitry are configured so that cycle information destined for the first I/O bus interface is enqueued from the system bus interface into the first logical FIFO and is dequeued from the first logical FIFO into the first I/O bus interface. Cycle information destined for the second I/O bus interface is enqueued from the system bus interface into the second logical FIFO and is dequeued from the second logical FIFO into the second I/O bus interface. A level-of-fullness monitor monitors the common storage system and generates first and second level-of-fullness indications responsive thereto. The system bus interface is operable to declare I/O halt and I/O resume conditions on a system bus responsive to halt and resume commands. The control circuitry issues the halt command when the first level-of-fullness indication is generated, and issues the resume command when the second level-of-fullness indication is generated. The first level-of-fullness indication is generated before the free storage capacity in the common storage system becomes less than a predetermined maximum size of post-halt cycle information. The second level-of-fullness indication is generated after the amount of free storage capacity in the common storage system becomes greater than the predetermined maximum size of the post-halt cycle information.

10 Claims, 8 Drawing Sheets

U.S. PATENT DOCUMENTS

| | | | | |
|---|---|---|---|---|
| 5,014,265 | | 5/1991 | Hahne et al. | 370/60 |
| 5,043,981 | * | 8/1991 | Firoozmand et al. | 370/235 |
| 5,133,062 | * | 7/1992 | Joshi et al. | 703/13 |
| 5,163,046 | | 11/1992 | Hahne et al. | 370/79 |
| 5,210,749 | * | 5/1993 | Firoozmand | 370/463 |
| 5,247,626 | * | 9/1993 | Firoozmand | 709/212 |
| 5,414,455 | | 5/1995 | Hooper et al. | 348/7 |
| 5,442,390 | | 8/1995 | Hooper et al. | 348/7 |
| 5,471,583 | * | 11/1995 | Au et al. | 710/57 |
| 5,487,061 | * | 1/1996 | Bray | 370/252 |
| 5,488,724 | * | 1/1996 | Firoozmand | 710/200 |
| 5,519,701 | * | 5/1996 | Colmant et al. | 370/412 |
| 5,521,916 | * | 5/1996 | Choudhury et al. | 370/414 |
| 5,553,061 | * | 9/1996 | Waggener, Jr. et al. | 250/491.1 |
| 5,604,742 | * | 2/1997 | Colmant et al. | 370/396 |
| 5,625,625 | | 4/1997 | Oskouy et al. | 370/395 |
| 5,649,230 | * | 7/1997 | Lentz | 710/52 |
| 5,687,316 | * | 11/1997 | Graziano et al. | 709/250 |
| 5,765,041 | * | 6/1998 | Cherichetti et al. | 710/52 |
| 5,797,043 | * | 8/1998 | Lewis et al. | 710/56 |
| 5,850,568 | * | 12/1998 | Hawkins et al. | 710/57 |
| 5,937,205 | * | 8/1999 | Mattson et al. | 710/6 |
| 5,948,080 | * | 9/1999 | Baker | 710/37 |
| 5,974,483 | * | 10/1999 | Ray et al. | 710/52 |
| 5,974,516 | * | 10/1999 | Qureshi | 711/171 |
| 5,983,301 | * | 11/1999 | Baker et al. | 710/113 |
| 5,987,590 | * | 11/1999 | Wing So | 710/129 |
| 5,996,032 | * | 11/1999 | Baker | 710/62 |
| 6,006,286 | * | 12/1999 | Baker et al. | 710/22 |
| 6,044,225 | * | 3/2000 | Spencer et al. | 710/52 |
| 6,049,802 | * | 4/2000 | Waggener, Jr. et al. | 707/100 |
| 6,081,852 | * | 6/2000 | Baker | 710/24 |
| 6,134,625 | * | 10/2000 | Abramson | 710/241 |
| 6,137,807 | * | 10/2000 | Rusu et al. | 710/52 |
| 6,141,744 | * | 10/2000 | Wing So | 712/35 |
| 6,151,644 | * | 11/2000 | Wu | 710/52 |
| 6,178,473 | * | 1/2001 | Bonola | 710/554 |
| 6,188,699 | * | 2/2001 | Lang et al. | 370/463 |

OTHER PUBLICATIONS

Kim, H. S. "Multinet Switch: Multistage ATM Switch Architecture with Partially Shared Buffers", INFOCOM '93, Networking: Foundation of the Future, IEEE, v. 2, pp. 473–480.*

Kim, H. S. "Design and Performance of Multinet Switch: A Multistage ATM Switch Architecture with Partially Shared Buffers", IEEE/ACM Trans. Networking 2, 6 (Dec. 1994), pp. 571–580.*

Yener, B. et al. "Topological Design of Loss–Free Switch-Based LANs", INFOCOM '95, Proceedings, IEEE, 1995, v. 1, pp. 88–96.*

Bianchini, R.P. et al. "The Tera Project: A Hybrid Queueing ATM Switch Architecture for LAN", Selected Areas in Communications, IEEE Journal on, v. 13, Issue 4, May 1995, pp. 673–685.*

Collier, B.R. et al., "Traffic Rate and Shape Control with Queue Threshold Congestion Recognition", ICC '96, 1996 IEEE International conf on, v.2, pp. 746–750.*

Collier, B.R. et al. "Efficient Analysis of Shared Buffer Management Strategies in ATM Networks under Non–Uniform Bursty Traffic", INFOCOM '96, Proceedings, IEEE, v. 2, pp. 671–678.*

McKeown, N. et al. "Tiny Tera: A Packet Switch Core", IEEE Micro, v. 17, Issue 1, Jan–Feb. 1997, pp. 26–33.*

* cited by examiner

ONE-TO-MANY BUS BRIDGE USING INDEPENDENTLY AND SIMULTANEOUSLY SELECTABLE LOGICAL FIFOS

FIELD OF THE INVENTION

This invention relates to computer buses and computer networks. More particularly, the invention relates to a one-to-many bus bridge that employs a multiple logical FIFO system to improve bandwidth efficiency and to reduce hardware size and cost.

BACKGROUND

A bus bridge is used to interface different types of computer buses. For example, in a conventional computer, CPUs and system memory may be coupled to one another via a high-speed system bus. Input output ("I/O") devices, on the other hand, may be coupled to a slower-speed I/O bus. In such an architecture, the system bus and the I/O bus are typically interfaced by means of a bus bridge. The function of such a bus bridge generally is to handle the translation of speeds and protocols in such a manner that bus cycles may occur on either side of the bridge in relatively independent fashion.

A first-in-first-out or "FIFO" buffer is a well-known memory tool often used to transfer data from a source system to a destination system wherein the rate of output from the source system is not always the same as the rate of input of the destination system.

One of the challenges presented in the design of bus bridges is to provide adequate FIFO buffering to accommodate the speed differences between a system bus and I/O buses without unduly increasing system cost and complexity. For example, assume an architecture in which programmed I/O cycles ("PIO cycles") originating from a CPU on a system bus may be destined for any one of n different I/O buses depending on the addresses involved in each cycle. One method of handling such an architecture in the bus bridge design is to provide n separate conventional FIFO buffers, one for each of the n destination I/O buses. Each PIO cycle originating on the system bus may then be placed in the FIFO buffer that corresponds to that cycle's destination I/O bus.

Assume further that flow control on the system bus is indirect in the sense that, once the bus bridge indicates an I/O halt condition, numerous forthcoming PIO cycles may yet need to be processed by the bus bridge before all PIO cycles cease to issue from the system bus. In such a circumstance, the bus bridge cannot know in advance to which I/O buses these post-halt PIO cycles will be destined. A designer must therefore assume the worst-case scenario—that all of the post-halt PIO cycles will be destined for the I/O bus having the fullest FIFO buffer at the time the I/O halt indication is given.

The result of this assumption is deleterious in at least two ways: First, it means that, as a rule, an I/O halt indication must be issued by the bus bridge whenever any one of its n FIFO buffers reaches a state in which the buffer would be completely filled should all post-halt PIO cycles be destined for it. Such a rule would be unfortunate from a bandwidth efficiency standpoint if the worst-case scenario occurs only rarely. Second, it means that the aggregate FIFO storage capacity in the bus bridge will be wasted because no more than one of the FIFO buffers could ever become completely full in a system that operates under such a rule.

It is therefore an object of the present invention to provide a one-to-many bus bridge design in which FIFO storage capacity is used in a manner that improves bandwidth efficiency and reduces circuit size and cost.

SUMMARY OF THE INVENTION

The invention includes numerous aspects, each of which contributes to achieving the above-recited objectives.

In a first aspect, a one-to-many bus bridge includes a system bus interface, a first I/O bus interface, a second I/O bus interface, a multiple logical FIFO system wherein first and second logical FIFOs share a common storage system, and demultiplexer and control circuitry. The demultiplexer and control circuitry are configured so that cycle information destined for the first I/O bus interface is enqueued from the system bus interface into the first logical FIFO and is dequeued from the first logical FIFO into the first I/O bus interface. Cycle information destined for the second I/O bus interface is enqueued from the system bus interface into the second logical FIFO and is dequeued from the second logical FIFO into the second I/O bus interface.

In another aspect, the bus bridge further includes a level-of-fullness monitor for monitoring the level of fullness of the common storage system in the multiple logical FIFO system. The level-of-fullness monitor generates first and second level-of-fullness indications depending on the amount of storage capacity remaining in the common storage system at a given point in time. The system bus interface further comprises a flow control input and is operable to declare I/O halt and I/O resume conditions on a system bus responsive to halt and resume commands, respectively, on the flow control input. The control circuitry issues the halt command when the first level-of-fullness indication is generated, and it issues the resume command when the second level-of-fullness indication is generated. Preferably, the first level-of-fullness indication is generated before the free storage capacity in the common storage system becomes less than a predetermined maximum size of post-halt cycle information that may come in through the system bus interface after an I/O halt condition is asserted. The second level-of-fullness indication may be generated after the amount of free storage capacity in the common storage system becomes greater than the predetermined maximum size of the post-halt cycle information.

In another aspect, the multiple logical FIFO system of the bus bridge uses a single main register file to store payload data in association with link data so as to form one linked list data structure for each logical FIFO in the system. A write pointer register file stores one write pointer for each logical FIFO. A read pointer register file stores one read pointer for each logical FIFO. A free register identifier indicates a free register address at all times unless the overall system is full. The free register address corresponds to one free register within the main register file. When a word of write data is to be enqueued into a logical FIFO, the following actions occur: An active write pointer register is selected within the write pointer register file responsive to a write FIFO number input. A destination register is selected within the main register file responsive to the contents of the active write pointer register. The word of write data is loaded into a payload data field of the destination register. And the free register address is loaded into both the active write pointer register and the link data field of the destination register. Thus, after the word of write data has been enqueued into a logical FIFO, it is stored in the main register file in association with a pointer to a new register in the main register file. The new register will be used to store the next data word for that logical FIFO. In order to ensure this result, the address of the new register has been loaded into the write pointer register corresponding to that logical FIFO. When a word of read data is to be dequeued from a logical FIFO, the following actions occur: An active read pointer register is selected within the read pointer register file responsive to a read FIFO number input. A source register is selected within the main register file responsive to the contents of the active read pointer register. The word of read data is routed from the payload data field of the source register to the read data output. And the contents of the link data field of the source register are loaded into the active read pointer register. Thus, after the word has been dequeued, the read pointer for that logical FIFO has been updated to point to the next oldest data in the FIFO.

In yet another aspect, the free register identifier may contain an array of storage cells, wherein each storage cell of the array corresponds to one of the registers within the main register file. The state of each storage cell is maintained to indicate whether the corresponding register in the main register file is free. The collective states of the storage cells may be applied to a priority encoder as an input word. The output of the priority encoder may be used to indicate the free register address.

In yet another aspect, the free register identifier may be implemented as a conventional FIFO buffer. In such an embodiment, the conventional FIFO buffer is operable to enqueue, as a new element of its contents, the address of the source register each time a word of read data is dequeued from a logical FIFO. And the conventional FIFO buffer is operable to dequeue one element of its contents each time a word of write data is enqueued into a logical FIFO. In this manner, the conventional FIFO buffer may be used to store addresses of free registers within the main register file. The free register address may be taken from the output of the conventional FIFO buffer.

In yet another aspect, the free register identifier may be implemented as an additional logical FIFO buffer within the multiple logical FIFO system. In such an embodiment the additional logical FIFO buffer is operable to enqueue, as a new element of its contents, the address of the source register each time a word of read data is dequeued from a logical FIFO. And the additional logical FIFO buffer is operable to dequeue one element of its contents each time a word of write data is enqueued into a logical FIFO. The free register address is taken from the output of the additional logical FIFO buffer.

A chief advantage of the bus bridge of the invention is that the entire FIFO storage capacity of the bus bridge is allocated dynamically among the logical FIFOs as needed during the operation of the system. Consequently, I/O halt indications need be generated by the bus bridge only when the free space remaining in the entire FIFO structure equals the space needed to store any post-halt PIO cycles. This produces improved bandwidth efficiency relative to the one-to-many bus bridge designs of the prior art. Moreover, the bus bridge design of the invention economizes memory requirements: In contrast to the above-described prior art solution requiring multiple conventional FIFOs wherein only one of the FIFOs could ever be filled completely, the available FIFO storage capacity of the inventive bus bridge may be utilized entirely because it is shared among the logical FIFOs in the system.

DETAILED DESCRIPTION OF THE PREFERRED EMBODIMENTS

One of the components of the bus bridge system of the invention is a multiple logical FIFO buffer system. That component will be described in sections 1–4 below. Empty and full indicators constitute other components of the bus bridge system of the invention. They will be described in section 5. Then, an embodiment of a bus bridge system incorporating a multiple logical FIFO buffer system and empty and full indicators will be described in section 6.

1. Functional Overview of a Multiple Logical FIFO System

Figure 1:
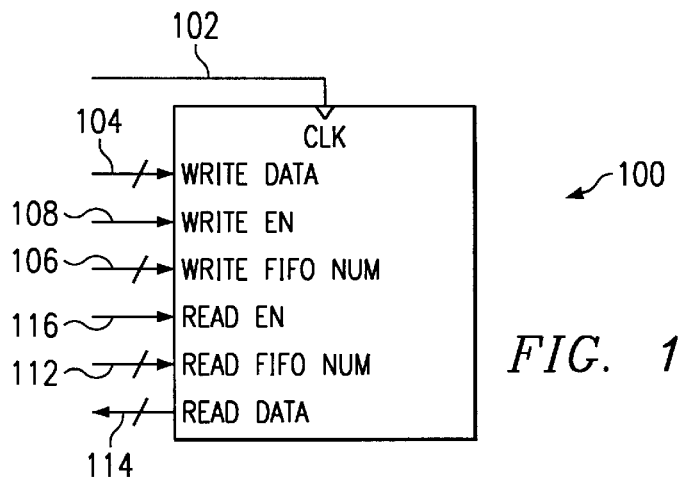
FIG. 1 is a block diagram schematically illustrating a preferred set of inputs and outputs for a multiple logical FIFO system for use in an embodiment of the invention.

Multiple logical FIFO systems suitable for use in the bus bridge of the invention are susceptible to numerous alternate embodiments. In each embodiment, however, certain functional commonalities exist. For example, in each embodiment, there is a single write data port and a single read data port; and payload data words are enqueued and dequeued to and from particular logical FIFOs within the multiple logical FIFO system according to FIFO selection numbers that are applied to a write FIFO num input and a read FIFO num input, respectively. Therefore, this detailed description will begin with a functional discussion of write and read timing for multiple logical FIFO system 100 as shown in FIG. 1. The write and read timing for multiple logical FIFO system 100 is generic to each of the specific embodiments to be discussed in more detail below. Note, however, that multiple logical FIFO system 100 is illustrated with a single clock input 102 which is used for both write and read operations. This single-clock-input embodiment is described in this section for the purpose of simplifying the initial discussion; but a multiple logical FIFO system suitable for use in an embodiment of the invention may use separate clocks for read and write operations, as will be explained in detail below.

Figure 2:
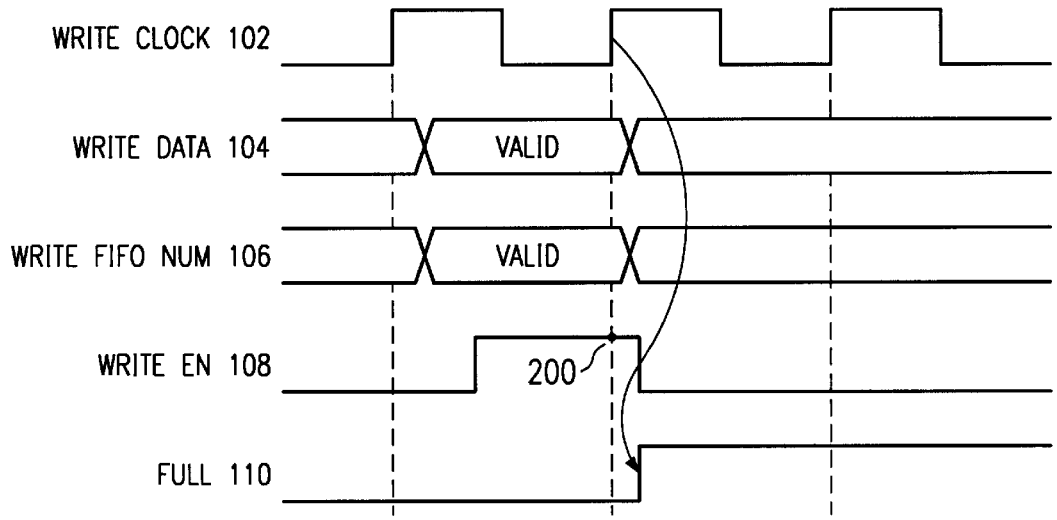
FIG. 2 is a timing diagram illustrating preferred write timing for the multiple logical FIFO system of FIG. 1.

FIG. 2 is a timing diagram illustrating preferred write timing for the multiple logical FIFO system of FIG. 1. A data word is enqueued into one of multiple logical FIFOs in buffer system 100 synchronous to clock 102 by (1) presenting the data word on write data bus 104, (2) presenting, on write FIFO num bus 106, a number identifying the logical FIFO to which the data word should be written, and (3) applying a pulse on write enable signal 108 when the write data and the write FIFO num are valid. The data word is loaded into the selected logical FIFO on the next rising edge of write clock 102, as shown in the diagram at 200. Shortly after the data word is loaded, a full indicator 110 (not shown in FIG. 1) will become asserted if the data word just loaded had the effect of filling the remaining payload storage capacity of the multiple logical FIFO system 100. (The meaning of the term "payload storage capacity" will be explained in more detail below.)

Figure 3:
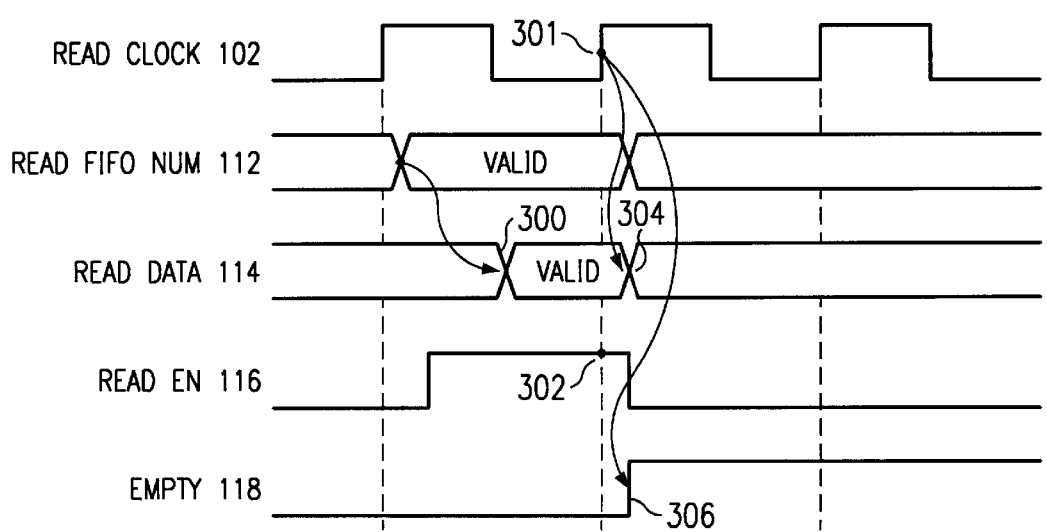
FIG. 3 is a timing diagram illustrating preferred read timing for the multiple logical FIFO system of FIG. 1.

FIG. 3 is a timing diagram illustrating preferred read timing for the multiple logical FIFO system of FIG. 1. A data word is dequeued from one of multiple logical FIFOs in buffer system 100 synchronous to clock 102 by (1) presenting, on read FIFO num bus 112, a number identifying the logical FIFO from which the data word should be read, and (2) applying a pulse on read enable signal 116. Data responsive to read requests appear on read data bus 114. As is shown in the diagram at 300, read data 114 becomes valid even before rising edge 301 occurs. The pulse on read enable 116 during rising edge 301 is necessary, though, to update the read pointer that corresponds to the particular logical FIFO being read, as will be explained in more detail below. The read pointer is updated on the rising edge, as is indicated in the diagram at 302. Shortly thereafter, read data 114 becomes invalid, as shown at 304. Thus, read data 114 should be consumed on rising edge 301. The empty indicator 118 (not shown in FIG. 1) that corresponds to the particular logical FIFO just read will become asserted at point 306 if the data word read just read was the only data word remaining in that particular logical FIFO.

2. Multiple Logical FIFO System—First Embodiment

Figure 4:
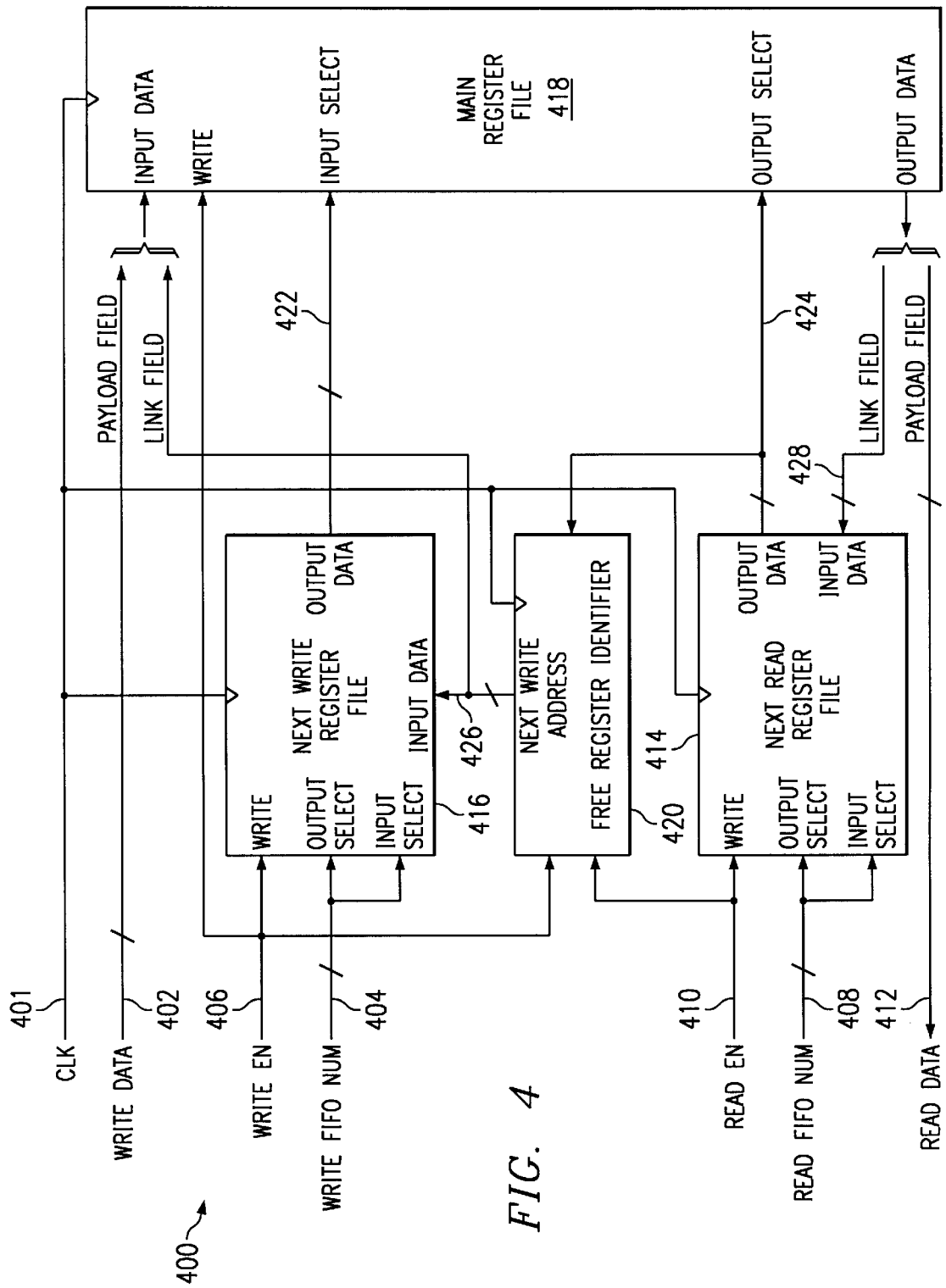
FIG. 4 is a block diagram schematically illustrating a first multiple logical FIFO system for use in an embodiment of the invention.

FIG. 4 illustrates in detail a first multiple logical FIFO system 400 suitable of use in an embodiment of the invention. Multiple logical FIFO system 400 operates with a common read and write clock 401 (e.g., for applications in which the read and write sides of the host system are in the same clock domain). In multiple logical FIFO system 400, reads and writes may occur on the same clock edge.

Structure

Whereas read and write pointers in conventional FIFO buffer systems are maintained by counters, the read and write pointers in buffer system 400 are maintained in register files. Specifically, read pointers are stored in next read register file 414, and write pointers are stored in next write register file 416. A third register file, main register file 418, is shared by all of the logical FIFOs in buffer system 400. Moreover, within register file 118, registers that contain data corresponding to one logical FIFO need not be segregated from registers that contain data corresponding to other logical FIFOs. Instead, data corresponding to the various logical FIFOs may be freely interleaved in file 118 with register-sized granularity. This result is accomplish by means of a linked list storage technique, which will be further described below. Free register identifier 120 is used to keep track of which registers within register file 118 are free. (A free register is one that neither currently contains payload data corresponding to a logical FIFO, nor has been reserved for use during the next write to a logical FIFO.)

Figure 5:
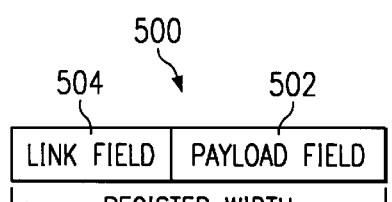
FIG. 5 is a block diagram illustrating a preferred set of bit fields to be contained in each of the registers of the main register file of FIG. 4.

Each of the registers in register file 418 is capable of storing information in two fields, as illustrated in FIG. 5. Example register 500 contains a payload field 502 and a link field 504. Payload field 502 stores a data word that has been enqueued into a given logical FIFO. Link field 504 stores a pointer to the location in register file 418 of the next data word in the same logical FIFO. Payload field 502 may be any convenient width, as determined by the size of the individual data words that will be enqueued into the logical FIFOs. In order to explain the preferred width for link field 504, a short digression will be useful:

"Payload storage capacity" will be defined herein as the number of registers remaining in register file 418 at any given moment that can be used to store a new data word for any logical FIFO. Because each of the write pointers stored in "next write" register file 416 effectively reserves one register in file 418 for a subsequent write operation, there will always be one unused register in file 418 for each logical FIFO. Thus, maximum payload storage capacity is equal to the total storage capacity of register file 418 minus this overhead. In an example implementation, if it were desired to support m logical FIFOs with a maximum payload storage capacity of n registers, then register file 418 would need to contain (n+m) registers. Link field 504, then, would need to be at least $\log_2(n+m)$ bits wide. If the quantity $\log_2(n+m)$ is not an integer, then it should be rounded up to determine the proper width of link field 504.

Figure 6:
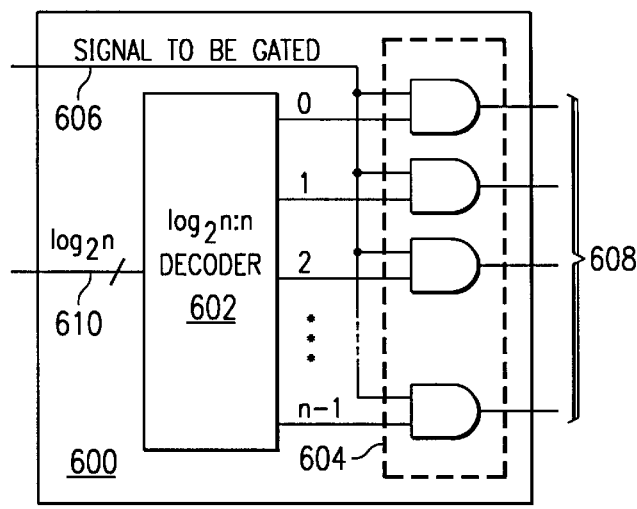
FIG. 6 is a block diagram schematically illustrating an example decode/gate functional block.
Figure 7:
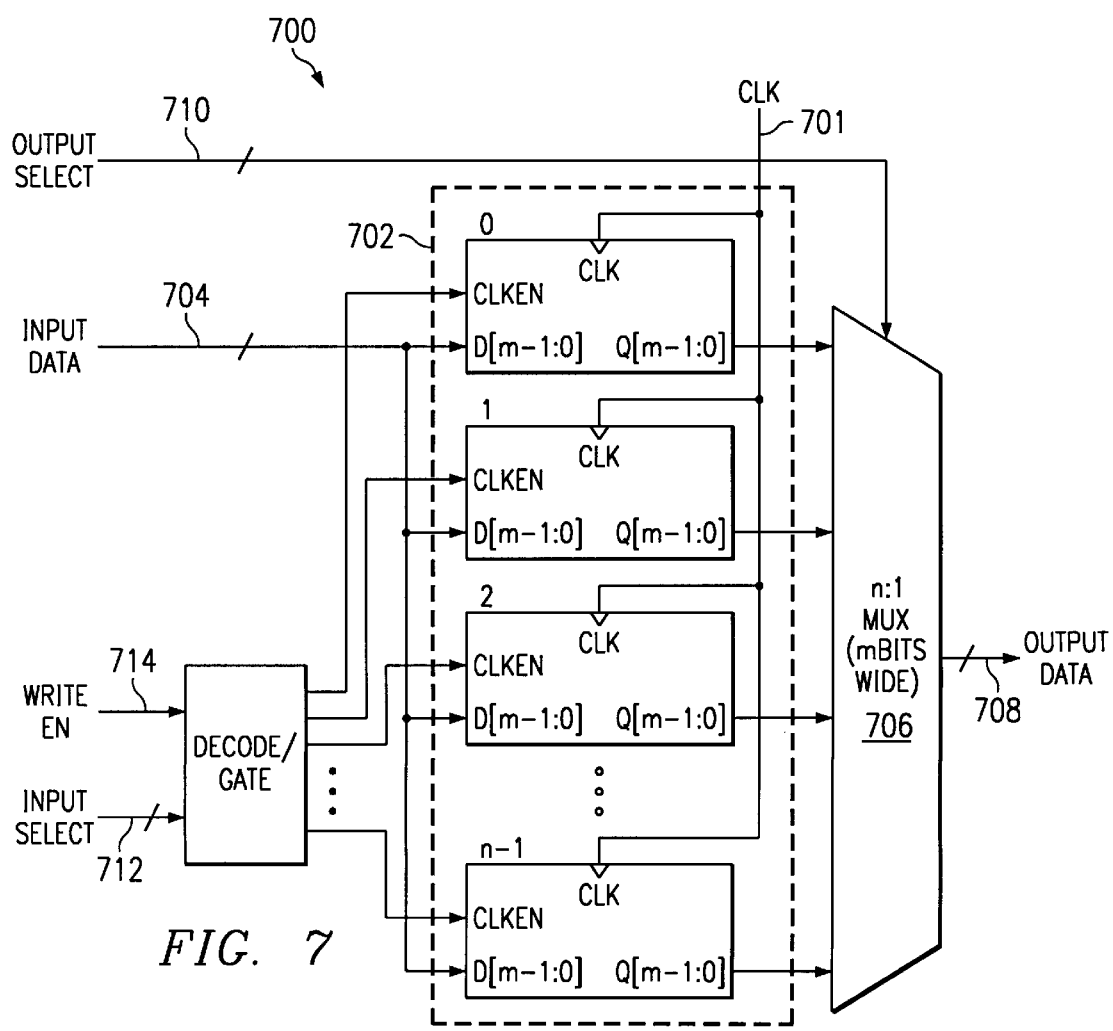
FIG. 7 is a block diagram schematically illustrating an example register file.

Because the phrases "decode/gate block" and "register file" are used herein to describe various aspects of the preferred embodiments, FIGS. 6 and 7 are included to explain those phrases by way of example. Referring now to FIG. 6, an example decode/gate block 600 includes a $\log_2 n{:}n$ decoder 602 and a series of two-input AND gates 604. One input of each of AND gates 604 is coupled to one of the outputs of decoder 602. The other input of each of AND gates 604 is coupled to a signal to be gated 606. The result of this circuit arrangement is that only one of outputs 608 of decode/gate block 600 will be active at any given time as determined by select inputs 610. Whichever one of outputs 608 is active will follow the state of signal to be gated 606.

Referring now to FIG. 7, an example register file 700 includes an array 702 of n m-bit registers, each register having its clock input coupled to a common clock signal 701, as shown. Input data bus 704 is m bits wide and is coupled to the data inputs of each of the n registers in array 702. The m-bit data outputs of the registers in array 702 are coupled to an m-bit-wide n:1 multiplexer 706. Output data bus 708 is m bits wide and will reflect the output of one of the n registers in array 702 as determined by the state of output select bus 710. New data may be loaded into any one of the registers in array 702 synchronous to clock 701 by applying the new data to input data bus 704, applying the number of the target register to input select bus 712, and applying a pulse to write signal 714. Each of register files 414, 416 and 418 may be constructed according to the design of example register file 700.

Figure 8:
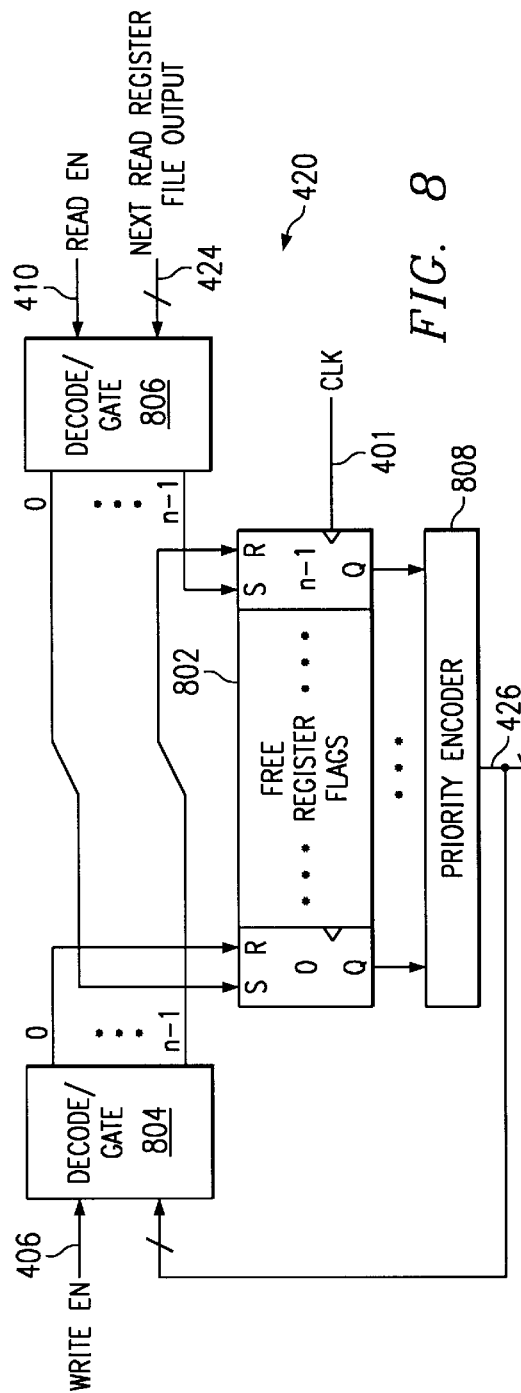
FIG. 8 is a block diagram illustrating a preferred design for the free register identifier of FIG. 4.

FIG. 8 illustrates a preferred design for free register identifier 420 of FIG. 4. For each of the n registers contained in register file 418, free register identifier 420 contains one storage cell, represented in the drawing by storage cell array 802 labeled "free register flags." A first decode/gate block 804 gates write enable signal 406 to the R input of one of the storage cells in array 802 as determined by the output of priority encoder 808. A second decode/gate block 806 gates read enable signal 410 to the S input of one of the storage cells in array 802 as determined by the state of bus 424, which is coupled to the output of next read register file 414. If the Q output of any one of the storage cells in array 802 is asserted, then we can conclude the corresponding register in register file 418 is free. The Q outputs from all of the storage cells in array 802 are fed as inputs to a conventional priority encoder 808. The output of priority encoder 808 will indicate the address of one free register in register file 418 (as determined by the states of storage cells 802 and whatever encoding scheme is chosen for priority encoder 808) whenever at least one free register in file 418 exists. The design shown in FIG. 4 for free register identifier 420 is suitable for applications in which a single clock serves as both a read and a write clock.

Operation

To provide a better understanding of multiple logical FIFO system 400, an operational example will now be discussed. Assume it is desired to support eight independent logical FIFO buffers 0–7 using a single register file 418. A read pointer and a write pointer are needed for each of the desired logical FIFOs. Therefore, register files 414 and 416 must contain eight registers each.

Pointer Initialization: At initialization, the read and write pointers for a given logical FIFO should contain the same value. Therefore, at initialization, the eight registers in register file 416 may be loaded, for example, with the values 0–7 respectively. The corresponding eight registers of register file 414 should be loaded with the same values 0–7. After this has been done, the read and write pointers corresponding to logical FIFO 0 will both point to register 0 in register file 418; the read and write pointers corresponding to logical FIFO 1 will both point to register 1 in register file 418; and so on.

Free Register Identifier Initialization: Because of the initial values that have just been stored in register file 416 at initialization, registers 0–7 in register file 418 have now been "reserved" for use when the first writes to logical FIFOs 0–7 occur. Therefore, another requirement at initialization time is to "reset" storage cells 0–7 in storage cell array 802. All of the other storage cells in array 802 should be "set" initially, to indicate that registers 8 to n–1 in register file 418 are free.

Example Enqueueing Operation: Assume next that the first real operation for buffer system 400 will be to enqueue a data word into logical FIFO 0. To accomplish this, the data word to be enqueued is presented on write data bus 402, the number 0 is presented on write FIFO num bus 404, and a pulse is applied on write enable signal 406. The result of this will be as follows: Register 0 in file 416 will be selected both for input and output, since the input select port and the output select port of file 416 are both coupled to write FIFO num bus 404. Consequently, the contents of register 0 in file 416 will be applied to the input select port of register file 418. Because register 0 in file 416 contained 0, register 0 in file 418 will be selected for input. Meanwhile, priority encoder 808 arbitrarily selects the lowest-numbered free register in file 418. Thus, free register identifier 420 will be indicating the number 8 (corresponding to the address of free register 8 in file 418) on bus 426.

When the pulse is applied to write enable signal 406, action occurs in both of files 416 and 418: In file 416, the contents of bus 426 are loaded into register 0. In file 418, the contents of buses 402 and 426 are loaded into register 0. Specifically, the contents of bus 402 are loaded into the payload field of register 0 in file 418, and the contents of bus 426 are loaded into the link field of register 0 in file 418.

Note: The contents of bus 426 are loaded into both register 0 in file 416 and the link field of register 0 in file 418. The information stored in register 0 of file 416 will serve as the write pointer for the next enqueueing operation involving logical FIFO 0. The information stored in the link field of register 0 in file 418 will be used by next read register file 414 during a subsequent dequeueing operation involving logical FIFO 0, as will be discussed in more detail below.

When the above-mentioned pulse is applied to write enable signal 406, action also occurs within free register identifier 420: Because the number 8 is present at the output of priority encoder 808 when the pulse is applied decode/gate 804 will route the write pulse to the R input of storage cell 8 in array 802. Thus, storage cell 8 will be reset synchronous with clock 401. This will cause a new output to appear on the output of priority encoder 808, taking into account the fact that register 8 in file 418 has just been reserved and is no longer free. The new output in this example will be 9. The new address may then be used during the next enqueueing operation involving buffer system 400.

Now assume that many enqueueing and dequeueing operations have been accomplished for each of the eight logical FIFOs in buffer system 400. Because these events have occurred, initialization conditions no longer exist. Instead, what exists in register file 418 is a set of eight linked lists. Each linked list consists of a series of data words stored in associated (but not necessarily contiguous) locations within file 418. Each linked list represents a logical FIFO buffer, wherein each data word in the list is associated with a link field that contains a pointer to the location of the next data word in that list or logical FIFO buffer. In the case of the most recently enqueued data word for a given logical FIFO, recall that the link field will contain a pointer to an unused but "reserved" register within file 418 that may be used for a subsequent write to that logical FIFO.

For the sake of further illustration, now consider a dequeueing operation under the just-described conditions involving, say, logical FIFO number 3. Each of the registers in file 414 contains a pointer to the next out data in the corresponding logical FIFO. To begin the dequeueing operation for logical FIFO 3, the number 3 is presented on read FIFO num bus 408. This selects register 3 within register file 414 for both input and output. Because register 3 in file 414 is selected for output, its contents are presented to the output select port of file 418 via bus 424. This results in a register within file 418 being selected for output (in this case, the register that contains the next out data for logical FIFO 3); its contents appear at the output data port of file 418. Consequently, data responsive to the read request on logical FIFO 3 is presented on read data bus 112. (Recall from FIG. 3 that this read data must be consumed on the rising edge of clock 401 that occurs during the pulse on read enable signal 410.) At the same time as this payload data appears on read data bus 412, the link field data associated with it is presented to the input data port of file 414 via bus 428. This link field data is a pointer to the next location in logical FIFO number 3 (the next out data in the logical FIFO). When the pulse is applied on read enable signal 410, the contents of this link field are loaded into register 3 within file 414. Thus, the next time the number 3 is presented on read FIFO num bus 408, this new pointer value will be selected, which will result in the appropriate next out data in logical FIFO number 3 appearing on the output data port of file 418, and so on.

As long as the above-described initialization procedure is performed before operation begins, FIFO buffer system 400 may be used in this manner indefinitely. The only limitations that must be observed in such a system are that a read should never be performed on an empty logical FIFO, and a write should never be performed on any of the logical FIFOs if the entire structure is full. (Mechanisms for implementing empty and full indicators will be described below.)

3. Multiple Logical FIFO System—Second Embodiment

Figure 9:
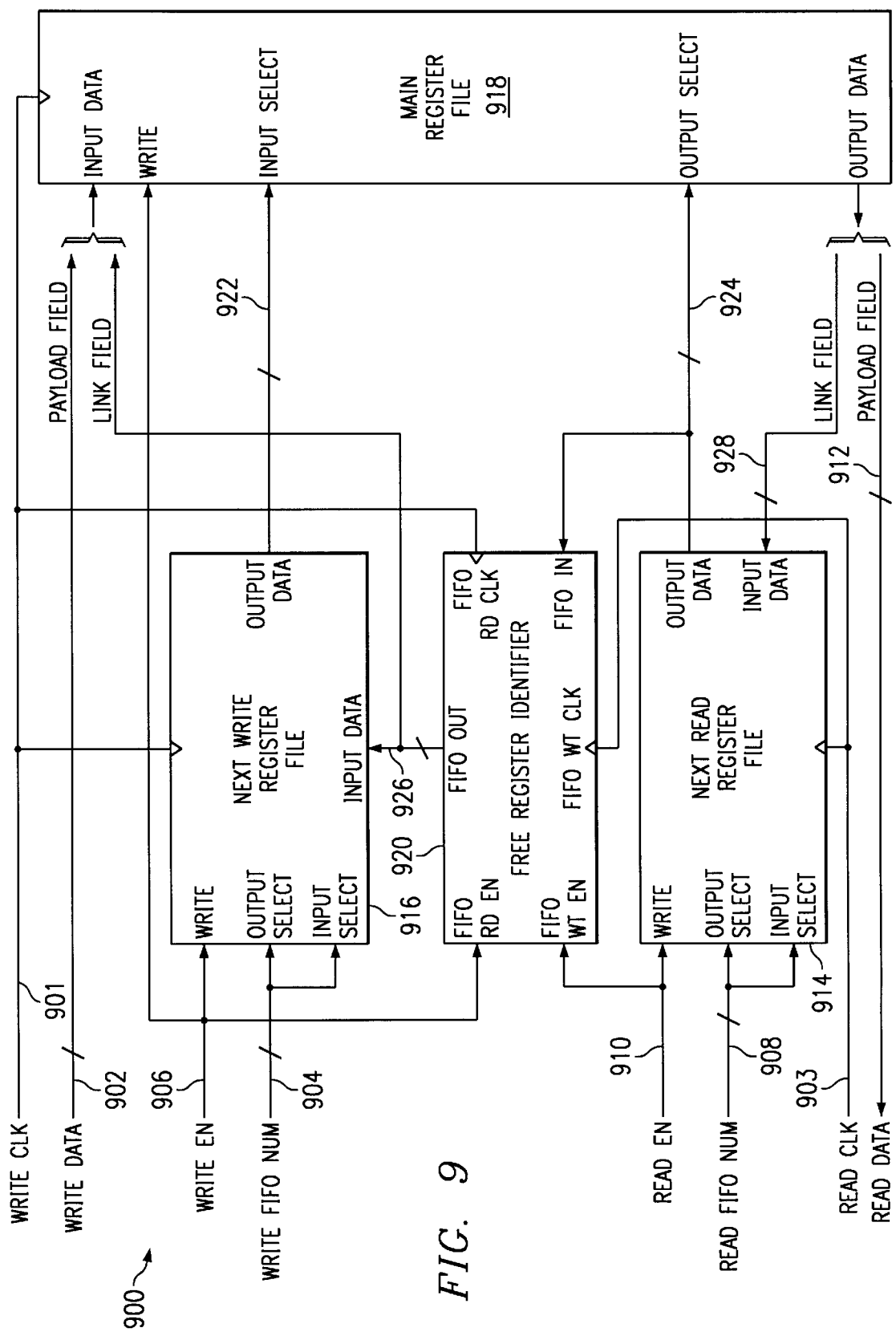
FIG. 9 is a block diagram schematically illustrating a second multiple logical FIFO system for use in an embodiment of the invention.

FIG. 9 illustrates in detail a second multiple logical FIFO system 900 suitable for use in an embodiment of the invention. In multiple logical FIFO system 900 write clock 901 is separate from read clock 903 (e.g., for applications in which the read and write sides of the host system are in different clock domains). The only other difference between multiple logical system 900 and multiple logical FIFO system 400 is that free register identifier 920 is implemented as a conventional FIFO buffer, whereas free register identifier 420 is implemented with a priority encoder. The output of FIFO 920 supplies the "next write address" for bus 926. The input of FIFO 920 is coupled to the output of register file 914 via bus 924. The enable and clock inputs of FIFO 920 are swapped in the following sense: Writes to multiple logical FIFO system 900 result in reads from FIFO 920. (This is to reflect the fact that the register address that was present on the output of FIFO 920 during the write to system 900 has now been loaded into one of the write pointer registers in file 916; thus, it is no longer appropriate for free register identifier 920 to present that address as a "free" one.) Reads from multiple logical FIFO system 900 result in writes to FIFO 920. (This is to reflect the fact that, once a read has occurred from FIFO system 900, the register in file 918 that was involved in the read is now "free," and thus its address should be available for future presentation on bus 926 by free register identifier 920.) The storage locations in FIFO 920 should have field widths wide enough to store addresses for the registers in file 418, and the number of storage locations in FIFO 920 should be at least as large as the number of registers corresponding to the maximum payload storage capacity of file 418. Recall that this number is going to be smaller than the total number of registers in file 418 because, at initialization, one register in file 418 is reserved for each logical FIFO in the implementation. FIFO 920 should be initialized to contain the addresses of all of the registers in file 418 with the exception of those registers that are reserved during initialization.

4. Multiple Logical FIFO System—Third Embodiment

Figure 10:
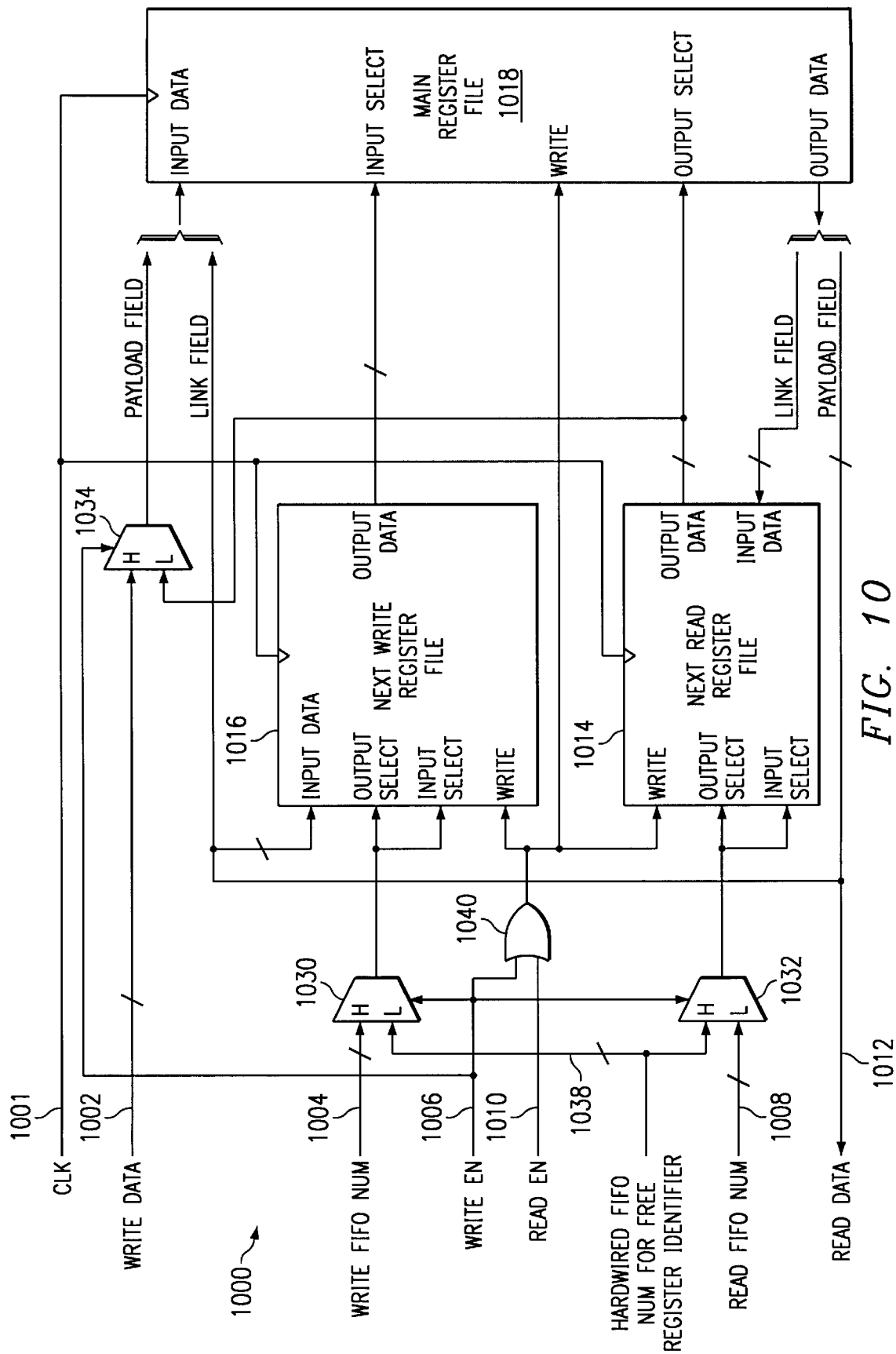
FIG. 10 is a block diagram schematically illustrating a third multiple logical FIFO system for use in an embodiment of the invention.

FIG. 10 illustrates in detail a third multiple logical FIFO system 1000 suitable for use in an embodiment of the invention. Like multiple logical FIFO system 400, multiple logical FIFO system 1000 operates with a common read and write clock 1001 (e.g., for applications in which the read and write sides of the host system are in the same clock domain). But, in multiple logical FIFO system 1000, the free register identifier is implemented as one of the logical FIFOs stored in main register file 1018. Therefore, reads and writes to regular (payload) logical FIFOs must never occur on the same clock. To accomplish the implementation of the free register identifier as a logical FIFO, multiplexers 1030, 1032, 1034 and OR gate 1040 are required as shown.

When a write occurs to multiple logical FIFO system 1000, the pulse applied to write enable signal 1006 causes each of muxes 1030–1034 to select its "high" input. Thus, write FIFO num bus 1004 is coupled to the select inputs of file 1016; write data bus 1002 is coupled to the payload field of the input data port of file 1018; and a hardwired (or programmable) number is presented to the select inputs of file 1014. This latter number selects, in file 1014, the read pointer corresponding to the free register identifier FIFO. Thus, simultaneous with the write to logical FIFO system 1000, a read will occur on the free register identifier logical FIFO (analogous to the operation of multiple logical FIFO system 900).

When a read occurs from multiple logical FIFO system 1000, the pulse applied to read enable signal 1010 causes each of muxes 1030–1034 to select its "low" input. Thus, read FIFO num bus 1008 is coupled to the select inputs of file 1014; but the payload field of the input data port of file 1018 is now coupled to the output data port of file 1014; and the select inputs of file 1016 are now coupled to the hardwired number corresponding to the free register identifier logical FIFO. Thus, when the read occurs from logical FIFO system 1000, a write occurs to the free register identifier logical FIFO (also analogous to the operation of multiple logical FIFO system 900).

5. Empty and Full Indicators

Depending on which of the three above-described embodiments is chosen for implementation of the multiple logical FIFO system, appropriate designs for empty and full indicators may vary slightly. For example, for applications in which reads and writes are synchronous to a common clock (e.g. multiple logical FIFO systems 400 and 1000), the design of the empty and full indicators for the multiple logical FIFO system may be simpler than for applications in which reads and writes are synchronous to different clocks (e.g. multiple logical FIFO system 900). Because the latter application represents the general case, it will be described in detail.

Figure 12:
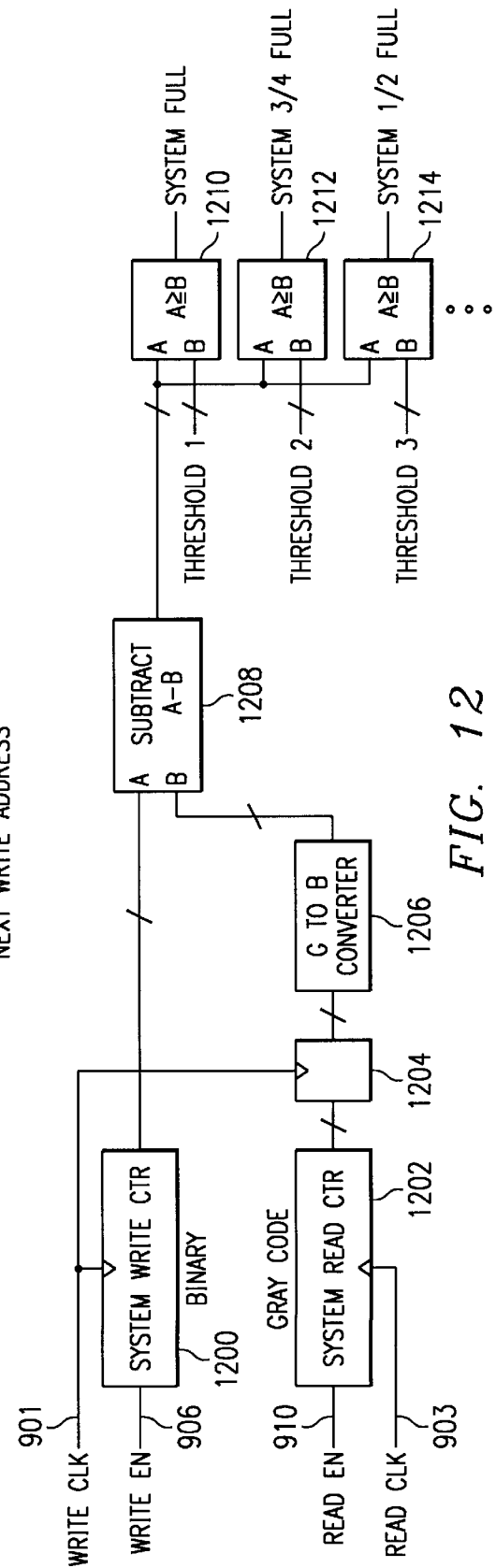
FIG. 12 is a block diagram schematically illustrating preferred circuitry for implementing full indicators for a multiple logical FIFO system for use in an embodiment of the invention.
Figure 11:
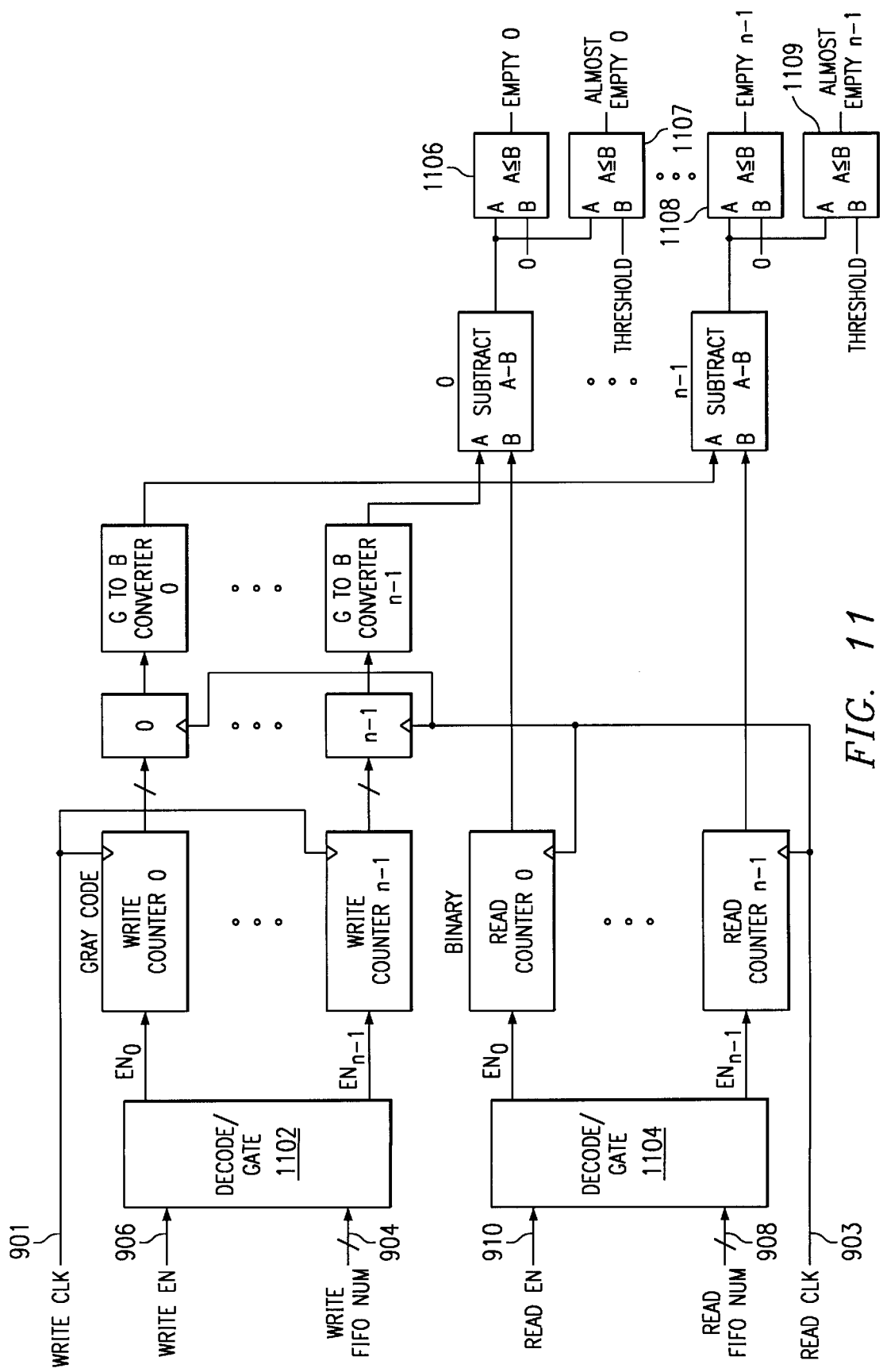
FIG. 11 is a block diagram schematically illustrating preferred circuitry for implementing empty indicators for a multiple logical FIFO system for use in an embodiment of the invention.

FIGS. 11 and 12 illustrate preferred circuitry for implementing empty and full indicators, respectively, a multiple logical FIFO system wherein reads and writes are synchronous to different clocks (e.g., multiple logical FIFO system 900). If n logical FIFOs were to be supported by multiple logical FIFO system 900, for example, then 2*(n+1) counters would be required. 2n counters would be required to implement the empty indicators (one empty indicator of each logical FIFO), and 2 additional counters would be required to implement the full indicator (one full indicator for the overall multiple logical FIFO system).

In the configuration of FIG. 11, all of write counters 0 to n−1 and all of read counters 0 to n−1 would be initialized to the same value. Thereafter, each write operation involving buffer system 900 will cause decode/gate block 1102 to increment one of write counters 0 to n−1, as determined by the value on write FIFO num bus 904 when a pulse is applied to write enable signal 906. Similarly, each read operation involving buffer system 900 will cause decode/gate block 1104 to increment one of read counters 0 to n−1, as determined by the value on read FIFO num bus 908 when a pulse is applied to read enable signal 910.

The empty indicators need to be visible in the read clock domain. Therefore, write counters 0 to n−1 should be Unit Distance Code counters, such as Gray Code counters. Their outputs should be applied to synchronization flip-flops 0 to n−1. And the output of the synchronization flip-flops should be converted from Gray Code back to binary by "G to B converters" 0 to n−1, as shown. Once this has been done, the outputs of the read counters may be subtracted from the synchronized and converted outputs of the write counters by subtractors 0 to n−1. The subtractors should perform and A−B subtraction modulo the width of the counters.

Comparators such as 1106–1109 compare the output of the corresponding subtractor with appropriate threshold values (constants) to produce one empty flag for each logical FIFO and, optional, an "almost empty" flag for each logical FIFO.

FIG. 12 illustrates preferred circuitry for implementing full indicators for a multiple logical FIFO system wherein reads and writes are synchronous to different clocks (e.g., multiple logical FIFO system 900). Only one write counter 1200 and one read counter 1202 are necessary, because "fullness" refers to the state of the overall logical FIFO system rather than to an individual logical FIFO. Any write operation to any logical FIFO in system 900 will cause system write counter 1200 to increment; and any read from any logical FIFO 900 will cause system read counter 1202 to increment. The full indicators should be visible in the domain of the write clock. Therefore, read counter 1202 should be a Gray Code counter. Its output is synchronized with the write clock by flip-flops 1204. The synchronized output of flip-flops 1204 is then converted to binary by converter 1206. Finally, subtractor 1208 determines the difference between the value of write counter 1200 and the synchronized and converted value of read counter 1202. The difference value is then compared with threshold constants by comparators 1210–1214 to generate numerous different level-of-fullness indications, as shown. For example, if counters 1200 and 1202 are initialized to contain the same value, then an appropriate value for Threshold 1 in FIG. 12 would be the number that corresponds to the maximum payload storage capacity of the main register file. Appropriate values for Thresholds 2 and 3 would then be ¾ and ½ of that number, respectively. Other appropriate numbers may be chosen for the threshold values depending on the application and depending on the levels of fullness that would be of interest in the application.

The configurations shown in FIGS. 11 and 12 will also function without modification in a system wherein reads and writes are synchronous to a common clock (e.g., multiple logical FIFO systems 400 and 1000). But if the reads and writes are synchronous to a common clock, as in multiple logical FIFO systems 400 and 1000, then the empty and full indicators may be simplified: A single up/down counter may be utilized for each logical FIFO to generate the empty indicators. A single up/down counter may be used to generate the system full indicators. And no synchronization techniques are necessary.

6. One-To-Many Bus Bridge Using Multiple Logical FIFOs

Figure 13:
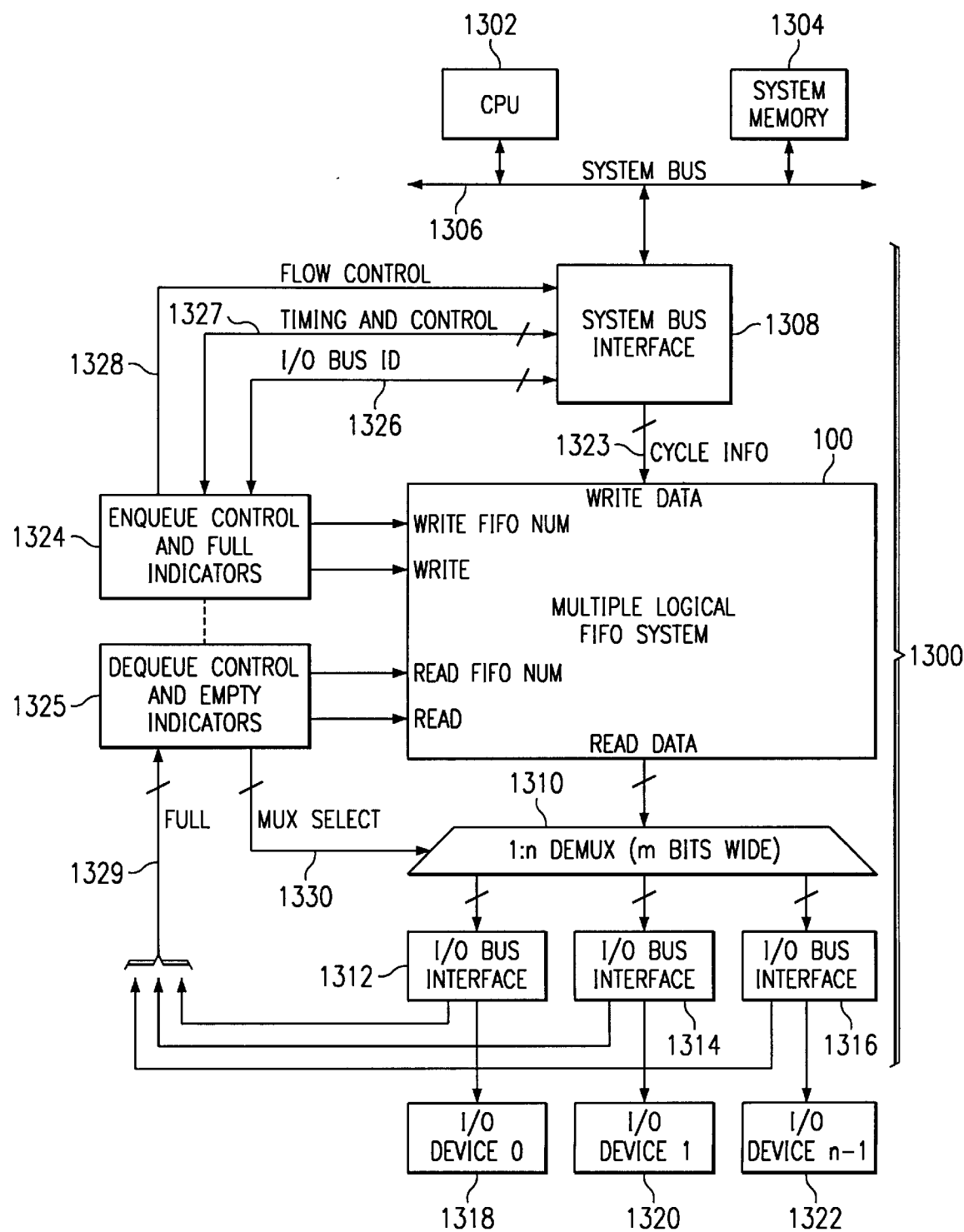
FIG. 13 is a block diagram schematically illustrating a one-to-many bus bridge using a multiple logical FIFO system according to a preferred embodiment of the invention.

FIG. 13 is a block diagram schematically illustrating a one-to-many bus bridge 1300 using a multiple logical FIFO system according to a preferred embodiment of the invention. CPU 1302 and system memory 1304 are coupled to high-speed system bus 1306. Bus bridge system 1300 is coupled to system bus 1306 via system bus interface 1308. Bus bridge system 1300 is coupled to I/O devices 1318–1322 separately via I/O bus interfaces 1312–1316, respectively. PIO cycle data originating on system bus 1306 and destined for one of I/O devices 1318–1322 may follow a path from system bus interface 1308 to the write data input of multiple logical FIFO system 100, and from the read data output of multiple logical FIFO system 100 to one of I/O bus interfaces 1312–1316 via 1:n demultiplexer 1310. Enqueueing of arriving PIO cycle information from system bus interface 1308 into multiple logical FIFO system 100 is handled by enqueue control and full indicators block 1324. Dequeueing of PIO cycle information from multiple logical FIFO system 100 to the appropriate I/O bus interfaces 1312–1316 is handled by dequeue control and empty indicators block 1325. Each of control blocks 1324 and 1325 may be implemented, for example, with state machines. Thus, they will be described hereinbelow in functional terms. The full and empty indicators in control blocks 1324 and 1325 may be implemented using any appropriate techniques, such as those described above in section 5.

For each arriving PIO cycle, system bus interface 1308 uses timing and control bus 1327 to indicate to control block 1324 when the new PIO cycle information is valid on bus 1323. It also indicates on bus 1326 a destination I/O bus ID corresponding to the cycle information appearing on bus 1323. Given an I/O bus ID corresponding to the incoming PIO cycle information, it is the responsibility of control block 1324 to enqueue the incoming PIO cycle information into multiple FIFO system 100. To do so, control block 1324 presents the number of the logical FIFO corresponding to the proper destination I/O bus on the write FIFO num input of multiple logical FIFO system 100, and pulses the write input of FIFO system 100 at a time when the PIO cycle information is valid at the write data input of FIFO system 100.

It is the responsibility of control block 1325 to dequeue PIO cycle information from the logical FIFOs in system 100 if any information exists therein, and if the full indicators 1329 from each of the I/O bus interfaces indicate that it is appropriate to do so. For each PIO cycle to be dequeued, control block 1325 must operate mux select lines 1330 to establish a data path between the read data output of FIFO system 100 and the proper destination I/O bus interface. Control block 1324 then presents the number of the logical FIFO corresponding to that I/O bus on the read FIFO num input of system 100, and pulses the read input of system 100.

Whenever control block 1324 determines that there is only enough payload storage capacity remaining in system 100 to accommodate the worst case number of PIO cycles after an I/O halt command, control block 1324 issues an I/O halt command to system bus interface 1008 via flow control signal 1328. After a sufficient amount of payload storage capacity within system 100 has been freed by subsequent dequeueing of stored PIO cycle information, control block 1324 issues an I/O resume command to system bus interface 1008 via flow control signal 1328. First and second level-of-fullness indicators for this purpose may be implemented by choosing appropriate threshold 1 and 2 values for the comparators shown in FIG. 12.

While the invention has been described in detail in relation to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims. For example, the bus bridge arrangement of FIG. 13 illustrates only a one-way data flow path, i.e., from the system bus toward the I/O devices. In a complete implementation of a bus bridge system, of course, datapaths must be provided for traffic flowing in the opposite direction—for example, read returns and DMA cycles. A bus bridge according to the invention may be beneficially employed in those applications as well. By replacing demultiplexer 1310 with a multiplexer, reversing the write data input and read data output ports of multiple logical FIFO system 100, and making corresponding adjustments in control blocks 1324 and 1325, a bus bridge system according to the invention may be constructed that will handle read return traffic and DMA cycles.

Such an implementation may be especially advantageous for applications wherein the protocol of system bus includes the possibility of "deferred reads." A deferred read connotes a read cycle that is originated by a CPU and seeks an immediate response; if the immediate response is not forthcoming, the CPU simply issues copies of the original read request at later times until the request is satisfied. This repeated issuance of the same read request, then, is analogous to a polling operation. When more than one CPU is coupled to system bus 1306, directly or indirectly, and when more than one deferred read is pending, the order of polling by the CPUs is not capable of being determined by system bus interface 1308.

If a bus bridge implementation according to the invention were used, then the deferred reads might be responded to by system bus interface 1308 in any order. Whereas, if a single conventional FIFO buffer were used to enqueue all read responses originating in I/O devices 1318–1322 and destined for system bus interface 1308, then the deferred reads could not be responded to in random order. Moreover, the multiple logical FIFO system of the inventive bus bridge will economize memory requirements within the bus bridge.

What is claimed is:

1. A one-to-many bus bridge, comprising:
   a system bus interface;
   first and second I/O bus interfaces;
   a dynamically-sized logical FIFO system having a write data input, a read data output, and read and write FIFO number inputs;
   a demultiplexer; and
   control circuitry coupled to the read and write FIFO number inputs;
   wherein:
   the system bus interface routes write data from a system bus to the write data input;
   the demultiplexer routes read data from the read data output to one of the I/O bus interfaces; and
   the write data are enqueued into a first logical FIFO, the read data are dequeued from a second logical FIFO, and the first and second logical FIFOs are selectable independently and simultaneously by the control circuitry.

2. The one-to-many bus bridge of claim 1:
   further comprising a level-of-fullness monitor for monitoring the level of fullness of a common storage system in the dynamically-sized logical FIFO system and generating first and second level-of-fullness indications responsive thereto;
   wherein the system bus interface further comprises a flow control input and is operable to declare I/O halt and I/O resume conditions on the system bus responsive to halt and resume commands, respectively, on the flow control input; and
   wherein the control circuitry is operable to issue the halt command to the flow control input responsive to the first level-of-fullness indication, and to issue the resume command to the flow control input responsive to the second level-of-fullness indication.

3. The one-to-many bus bridge of claim 2:
   wherein the system bus interface is operable to present post-halt cycle information to the write data input after it asserts the halt condition on the system bus, the post-halt cycle information subject to a predetermined maximum size; and
   wherein the level-of-fullness monitor generates the first level-of-fullness indication before the free storage capacity in the common storage system becomes less than the predetermined maximum size of the post-halt cycle information.

4. The one-to-many bus bridge of claim 3:
   wherein the level-of-fullness monitor generates the second level-of-fullness indication after the amount of free storage capacity in the common storage system becomes greater than the predetermined maximum size of the post-halt cycle information.

5. The one-to-many bus bridge of claim 1, wherein:
   the first and second logical FIFOs share a common storage system within the dynamically-sized logical FIFO system;
   the dynamically-sized logical FIFO system comprises a free location identifier for identifying locations in the common storage system that are available for storing new data; and
   wherein the free location identifier is implemented using a priority encoder.

6. The one-to-many bus bridge of claim 1, wherein:
   the first and second logical FIFOs share a common storage system within the dynamically-sized logical FIFO system;
   the dynamically-sized logical FIFO system comprises a free location identifier for identifying locations in the common storage system that are available for storing new data; and
   wherein the free location identifier is implemented using a FIFO.

7. A one-to-many bus bridge, comprising:
   a system bus interface;
   first and second I/O bus interfaces;
   a demultiplexer; and
   a dynamically-sized logical FIFO system having a write data input and a read data output;
   wherein:
   the system bus interface routes write data from a system bus to the write data input;
   the demultiplexer routes read data from the read data output to one of the I/O bus interfaces;
   the write data are enqueued into a first logical FIFO, the read data are dequeued from a second logical FIFO;
   the first and second logical FIFOs share a common storage system; and
   the dynamically-sized logical FIFO system comprises a priority encoder for identifying locations in the common storage system that are available for storing new data.

8. The one-to-many bus bridge of claim 7:
   further comprising a level-of-fullness monitor for monitoring the level of fullness of the common storage system and generating first and second level-of-fullness indications responsive thereto;
   wherein the system bus interface further comprises a flow control input and is operable to declare I/O halt and I/O resume conditions on the system bus responsive to halt and resume commands, respectively, on the flow control input; and
   wherein the control circuitry is operable to issue the halt command to the flow control input responsive to the first level-of-fullness indication, and to issue the resume command to the flow control input responsive to the second level-of-fullness indication.

9. The one-to-many bus bridge of claim 8:
   wherein the system bus interface is operable to present post-halt cycle information to the write data input after it asserts the halt condition on the system bus, the post-halt cycle information subject to a predetermined maximum size; and
   wherein the level-of-fullness monitor generates the first level-of-fullness indication before the free storage capacity in the common storage system becomes less than the predetermined maximum size of the post-halt cycle information.

10. The one-to-many bus bridge of claim 9:
wherein the level-of-fullness monitor generates the second level-of-fullness indication after the amount of free storage capacity in the common storage system becomes greater than the predetermined maximum size of the post-halt cycle information.

\* \* \* \* \*